United States Patent
Li et al.

(10) Patent No.: US 9,560,601 B2
(45) Date of Patent: Jan. 31, 2017

(54) RADIO FREQUENCY SYSTEM POWER BACK OFF SYSTEMS AND METHODS

(71) Applicant: APPLE INC., Cupertino, CA (US)

(72) Inventors: Jianjian Li, San Jose, CA (US); Vikas O. Jain, San Jose, CA (US); Peter M. Agboh, San Francisco, CA (US); Kaushal K. Mangtani, San Jose, CA (US); Manjit S. Walia, San Jose, CA (US); Mohit Narang, San Jose, CA (US); Abhishek Mehta, Milpitas, CA (US); Ruben Caballero, San Jose, CA (US)

(73) Assignee: Apple Inc., Cupertino, CA (US)

( * ) Notice: Subject to any disclaimer, the term of this patent is extended or adjusted under 35 U.S.C. 154(b) by 123 days.

(21) Appl. No.: 14/641,145

(22) Filed: Mar. 6, 2015

(65) Prior Publication Data

US 2016/0262110 A1    Sep. 8, 2016

(51) Int. Cl.
*H04W 52/22* (2009.01)

(52) U.S. Cl.
CPC .................................. *H04W 52/226* (2013.01)

(58) Field of Classification Search
CPC combination set(s) only.
See application file for complete search history.

(56) References Cited

U.S. PATENT DOCUMENTS

| 8,743,817 | B2 | 6/2014 | Lee et al. |
| 8,861,413 | B2 | 10/2014 | Immonen et al. |
| 2012/0021707 | A1* | 1/2012 | Forrester ............. H04W 52/281 455/103 |
| 2012/0270519 | A1* | 10/2012 | Ngai .................... H04W 52/226 455/404.1 |
| 2013/0165132 | A1 | 6/2013 | Goedken et al. |
| 2014/0355712 | A1* | 12/2014 | Langlais ................. H04L 25/02 375/295 |
| 2015/0055580 | A1 | 2/2015 | Lim et al. |

FOREIGN PATENT DOCUMENTS

WO    2013/067927 A1    5/2013

\* cited by examiner

*Primary Examiner* — Junpeng Chen
(74) *Attorney, Agent, or Firm* — Fletcher Yoder PC (57) ABSTRACT

Systems and method for improving design and/or operation of a radio frequency system are provided. One embodiment provides a radio frequency system, which includes a first look-up table that describes a static reference value, association between a maximum output power and a first specification level, and association between a first back off value and a second specification level, in which the first back off value is defined in relation to the static reference value and used to determine a first reduced output power; and a second look-up table that describes association between the maximum output power and a first set of operational parameters and association between the first reduced output power and a second set of operational parameters. The radio frequency system wirelessly transmits the analog electrical signal in compliance with an instructed specification level instruction by determining a desired output power based on the instructed specification level using the first look-up table and implementing operational parameters determined based on the desired output power using the second look-up table.

28 Claims, 7 Drawing Sheets

RADIO FREQUENCY SYSTEM POWER BACK OFF SYSTEMS AND METHODS

BACKGROUND

The present disclosure relates generally to radio frequency systems and, more particularly, to output power back off in a radio frequency system.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Many electronic devices may include a radio frequency system to facilitate wireless communication of data with another electronic device and/or a network. The radio frequency system may include a transceiver that outputs an analog representation of data desired to be wirelessly transmitted as an analog electrical signal. An amplifier component may then amplify the analog electrical signal to a desired output power and one or more filters may filter the amplified analog electrical signal to remove noise. The radio frequency system may then wirelessly transmit the filtered analog electrical signal via an antenna at a desired transmission radio frequency or range of frequencies.

Generally, standardization bodies may set standards and regulatory bodies may set regulations regarding wireless transmission by radio frequency systems. For example, the Federal Communications Commission (FCC) in the United States sets regulations on allowable spurious emissions transmitted by radio frequency systems, particularly in protected or restricted frequency bands. Additionally, the 3rd Generation Partnership Project (3GPP) sets standards on allowable out of band emissions at frequencies adjacent the transmission frequency and allowable spurious emissions at frequencies outside of the adjacent frequencies. In fact, the 3rd Generation Partnership Project provides multiple standard levels (e.g., network signaling values) that each sets varying standard on allowable out of band emissions and/or spurious emissions.

As such, a supervisory entity of a network, such as a wireless carrier, may instruct a connected radio frequency system to adhere to a particular specification level (e.g., regulation level or standard level). To facilitate meeting the specification level, the radio frequency system may adjust output power from a maximum output power to a reduced output power. However, since the maximum output power may be dynamic, relationship between the maximum output power and the reduced output power may vary.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

The present disclosure generally relates to improving design and/or operation of a radio frequency system. Generally, a supervisory entity of a network may instruct a radio frequency system to communicate with the network in compliance with set specifications (e.g., regulations and/or standards). The specifications may govern the quantity of out of band emissions and/or spurious emissions that are permitted to be transmitted onto the network. In some embodiments, the supervisory entity may send a specification level (e.g., network signaling value) informing the radio frequency system of the specifications that should be complied with when transmitting analog electrical signals. For example, the supervisory entity may send a network signaling value of NS_01 to instruct the radio frequency system to be in compliance with a first set of specifications, a network signaling value of NS_14 to instruct the radio frequency system to be in compliance with a second set of specifications, and a network signaling value of NS_15 to instruct the radio frequency system to be in compliance with a third set of specifications.

The present disclosure describes a radio frequency system that operates in compliance with an instructed specification levels (e.g., standard level or regulation level) by adjusting output power used to transmit analog electrical signals. More specifically, to facilitate compliance with an instructed specification level (e.g., network signaling value), the radio frequency system may implement a set of operational parameters that enables the radio frequency system to transmit an analog electrical signal at either a maximum output power or at a reduced output power. For example, the radio frequency system may implement a first set of operational parameters enabling transmission at the maximum output power when a network signaling value NS_01 is received, a second set of operational parameters enabling transmission at a first reduced output power when a network signaling value of NS_14 is received, and a third set of operational parameters enabling transmission at a second reduced output power when a network signaling value of NS_15 is received.

In some instances, the maximum output power of the radio frequency system may be adjusted (e.g., increased or decreased) based on various factors, such as various specifications (e.g., standards and/or regulations), power consumption, efficiency, and/or antenna performance. Thus, to improve the design process of the radio frequency system, the reduced output powers may be determined based on back off values in reference to a static reference value, which may vary from the maximum output power. In this manner, adjustments to the one or more reduced output powers may be obviated when the maximum output power is adjusted, thereby reducing a redesign process for the radio frequency system.

Moreover, in operation, the performance of the radio frequency system when transmitting analog electrical signals at a reduced output power may be improved. For example, when a particular specification level (e.g., network signaling value) is received, the radio frequency system may determine a reduced output power based on a back off value in reference to the static reference value. In some embodiments, the back off value may be determined via a first look-up table (e.g., a NS_XX LUT). The radio frequency system may then implement operational parameters associated with the reduced output power. In some embodiments, the associated operational parameters may be determined via a second look-up table (e.g., operational parameters LUT). In this manner, the radio frequency system may then transmit analog electrical signals at the reduced output power in compliance with the instructed specification level. Additionally, since the reduced output power is determined relatively independent from the maximum output power, the radio frequency may operate with improved transmission reliability (e.g., higher output power with reduced margin from the specifications).

BRIEF DESCRIPTION OF THE DRAWINGS

Various aspects of this disclosure may be better understood upon reading the following detailed description and upon reference to the drawings in which.

DETAILED DESCRIPTION

One or more specific embodiments of the present disclosure will be described below. These described embodiments are only examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but may nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

As mentioned above, an electronic device may include a radio frequency system to facilitate wirelessly communicating data with another electronic device and/or a network. More specifically, the radio frequency system may modulate radio waves to enable the electronic device to communicate via a personal area network (e.g., Bluetooth network), a local area network (e.g., an 802.11x Wi-Fi network), and/or a wide area network (e.g., a 4 G or LTE cellular network). In other words, the radio frequency systems may utilize various wireless communication protocols to facilitate communication of data.

Nevertheless, radio frequency systems may generally be operationally similar regardless of the wireless communication protocol used. For example, to transmit data, processing circuitry may generate a digital representation of the data as a digital electrical signal and a transceiver (e.g., a transmitter and/or a receiver) may then convert the digital electrical signal into one or more analog electrical signals. The analog electrical signals may be wirelessly transmitted at a specific output powers via an antenna based on various factors, such as communication protocol, distance, supervisory entity instructions, instructed specification levels (e.g., standard level or regulation level), and the like.

To help illustrate, in a long-term evolution (LTE) context, a wireless carrier (e.g., acting as a supervisory entity) may instruct a radio frequency system to communicate with the network in compliance with a particular network signaling value (e.g., specification level). More specifically, the 3rd Generation Partnership Project (3GPP) sets multiple network signaling values (NS_XX) which each includes standards on allowable out of band emissions at frequencies adjacent a transmission frequency and/or allowable spurious emissions at frequencies outside of the adjacent frequencies. As such, during operation, the wireless carrier may instruct the radio frequency system to communicate with the network in compliance with standards set out in one of the network signaling values (e.g., NS_01, NS_12, NS_13, or NS_15).

Generally, each specification level (e.g., network signaling value) has varying strictness. For example, in the LTE context, NS_01 may provide a spurious emissions limit of −36 dBm, NS_12 may provide a spurious emissions limit of −42 dBm, NS_13 may provide a spurious emissions limit of −42 dBm, and NS_15 may provide a spurious emissions limit of −53 dBm. To facilitate compliance with an instructed specification level, the radio frequency system may associate each specification level with a particular output power and a set of operational parameters implemented to achieve the output power. For example, the radio frequency system may implement a first set of operational parameters enabling transmission at a maximum output power when a network signaling value of NS_01 is received, a second set of operational parameters enabling transmission at a first reduced output power when a network signaling value of NS_12 is received, a third set of operational parameters enabling transmission at a second reduced power when a network signaling value of NS_13 is received, and a fourth set of operational parameters enabling transmission at a third reduced power when a network signaling value of NS_15 is received.

In other words, the radio frequency system may comply with a specification level instruction from a supervisory entity by adjusting output power of transmitted analog electrical signals between a maximum output power and one or more reduced output powers. In fact, some standardization bodies may specify a maximum amount of output power back off in relation to the maximum output power that may be used to be in compliance with each specification level. For example, the 3rd Generation Partnership Project (3GPP) may standardize that a maximum back off to comply with NS_12 is 6 dBm (e.g., Maximum Power Reduction+Additional Maximum Power Reduction) from the maximum output power. As such, it may be possible to design the radio frequency system to determine each reduced output power in relation to the maximum output power.

In some instances, the maximum output power may be adjusted (e.g., increased/decreased) based on various factors, such as various specifications (e.g., standards and/or regulations), power consumption, efficiency, and/or antenna performance. As such, when the reduced output powers are determined based on the maximum output power, each adjustment to the maximum output power may also affect performance of the radio frequency system at each of the reduced output powers. For example, when the maximum output power is increased, the reduced output powers may also be increased, thereby causing non-compliance with an instructed specification level. On the other hand, when the maximum output power is decreased, the reduced output powers may also be decreased, thereby reducing reliability of communication and producing a larger margin from the instructed specification level.

To account for such performance issues, the radio frequency system may be redesigned to adjust the reduced output powers and associated operational parameters each time the maximum output power is adjusted. As such, when the reduced output powers are determined based on the maximum output power, each adjustment to the maximum output power may lengthen and/or complicate the design process of the radio frequency system.

Accordingly, as will be described in more detail below, the present disclosure provides techniques to improve design and/or operation of a radio frequency system. In some embodiments, the radio frequency system may include a first look-up table (LUT) that specifies a back off value based on a received specification level (e.g., network signaling value) in relation to a static reference value. Additionally, the radio frequency system may include a second look-up table that specifies operational parameters associated with various output powers. Thus, the radio frequency system may control operation by determining a reduced output power based on the static reference value and the back off value determined from the first look-up table and by implementing operational parameters associated with the reduced output power determined from the second look-up table.

In this manner, the design process and/or operation of the radio frequency system may be improved. More specifically, although various factors may cause the maximum output power to be adjusted, the one or more reduced output powers may remain constant. As such, redesign costs associated with each adjustment to the maximum output power may be reduced because adjustments to the one or more reduced output power may be obviated. Additionally, in operation, transmission of analog electrical signals at one of the one or more reduced output powers may be in compliance with an instructed specification level, have improved transmission reliability (e.g., higher output power), and have reduced margin between operation (e.g., transmitted spurious emissions) and the specification level (e.g., allowable spurious emissions).

Figure 1:
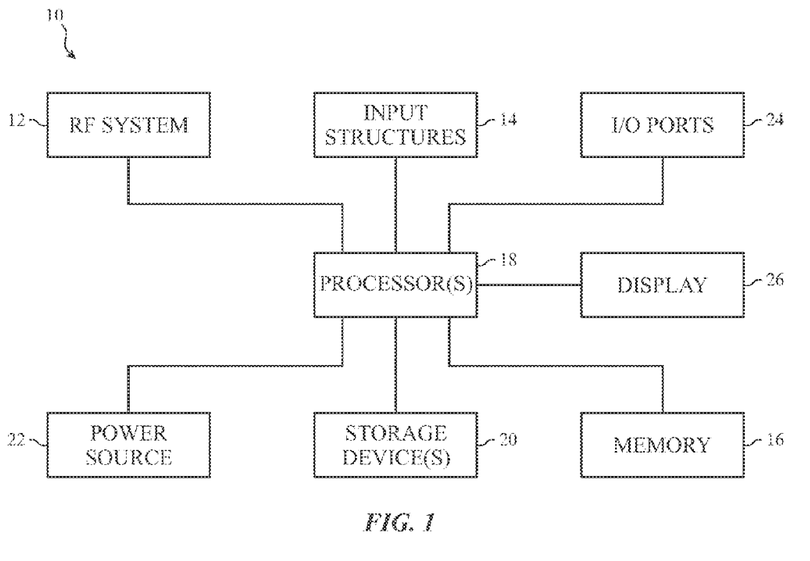
FIG. 1 is a block diagram of a electronic device with a radio frequency system, in accordance with an embodiment.

To help illustrate, an electronic device 10 that may utilize a radio frequency system 12 is described in FIG. 1. As will be described in more detail below, the electronic device 10 may be any suitable electronic device, such as a handheld computing device, a tablet computing device, a notebook computer, and the like.

Accordingly, as depicted, the electronic device 10 includes the radio frequency system 12, input structures 14, memory 16, one or more processor(s) 18, one or more storage devices 20, a power source 22, input/output ports 24, and an electronic display 26. The various components described in FIG. 1 may include hardware elements (including circuitry), software elements (including computer code stored on a non-transitory computer-readable medium), or a combination of both hardware and software elements. It should be noted that FIG. 1 is merely one example of a particular implementation and is intended to illustrate the types of components that may be present in the electronic device 10. Additionally, it should be noted that the various depicted components may be combined into fewer components or separated into additional components. For example, the memory 16 and a storage device 20 may be included in a single component.

As depicted, the processor 18 is operably coupled with memory 16 and the storage device 20. More specifically, the processor 18 may execute instruction stored in memory 16 and/or the storage device 20 to perform operations in the electronic device 10, such as instructing the radio frequency system 12 to communicate with another device. As such, the processor 18 may include one or more general purpose microprocessors, one or more application specific processors (ASICs), one or more field programmable logic arrays (FPGAs), or any combination thereof. Additionally, memory 16 and/or the storage device 20 may be a tangible, non-transitory, computer-readable medium that stores instructions executable by and data to be processed by the processor 18. For example, the memory 16 may include random access memory (RAM) and the storage device 20 may include read only memory (ROM), rewritable flash memory, hard drives, optical discs, and the like.

Additionally, as depicted, the processor 18 is operably coupled to the power source 22, which provides power to the various components in the electronic device 10. For example, the power source 22 may supply direct current (DC) electrical power to the radio frequency system 12. As such, the power source 22 may include any suitable source of energy, such as a rechargeable lithium polymer (Li-poly) battery and/or an alternating current (AC) power converter. Furthermore, as depicted, the processor 18 is operably coupled with I/O ports 24, which may enable the electronic device 10 to interface with various other electronic devices, and input structures 14, which may enable a user to interact with the electronic device 10. Accordingly, the inputs structures 14 may include buttons, keyboards, mice, trackpads, and the like. Additionally, in some embodiments, the electronic display 26 may include touch sensitive components.

In addition to enabling user inputs, the electronic display 26 may display image frames, such as a graphical user interface (GUI) for an operating system, an application interface, a still image, or video content. As depicted, the display is operably coupled to the processor 18. Accordingly, the image frames displayed by the electronic display 26 may be based on display image data received from the processor 18.

As depicted, the processor 18 is also operably coupled with the radio frequency system 12, which may facilitate communicatively coupling the electronic device 10 to one or more other electronic devices and/or networks. For example, the radio frequency system 12 may enable the electronic device 10 to communicatively couple to a personal area network (PAN), such as a Bluetooth network, a local area network (LAN), such as an 802.11x Wi-Fi network, and/or a wide area network (WAN), such as a 4 G or LTE cellular network. As can be appreciated, the radio frequency system 12 may enable communication using various communication protocols and/or varying output powers (e.g., strength of transmitted analog electrical signals).

Operational principles of the radio frequency system 12 may be similar for each of the communication protocols (e.g., Bluetooth, LTE, 802.11x Wi-Fi, etc.). More specifically, as will be described in more detail below, the radio frequency system 12 may convert a digital electrical signal containing data desired to be transmitted into an analog electrical signal using a transceiver. The radio frequency system 12 may then amplify the analog electrical signal to a desired output using an amplifier component and output the amplified analog signal using one or more antennae. In other words, although described in a long-term evolution (LTE) context, the techniques described herein may be applicable to any suitable radio frequency system 12 that operates in any suitable manner regardless of communication protocol used.

As described above, the electronic device 10 may be any suitable electronic device. To help illustrate, one example of a handheld device 10A is described in FIG. 2, which may be a portable phone, a media player, a personal data organizer, a handheld game platform, or any combination of such devices. For example, the handheld device 10A may be a smart phone, such as any iPhone® model available from Apple Inc. As depicted, the handheld device 10A includes an enclosure 28, which may protect interior components from physical damage and to shield them from electromagnetic interference. The enclosure 28 may surround the electronic display 26, which, in the depicted embodiment, displays a graphical user interface (GUI) 30 having an array of icons 32. By way of example, when an icon 32 is selected either by an input structure 14 or a touch sensing component of the electronic display 26, an application program may launch.

Figure 2:
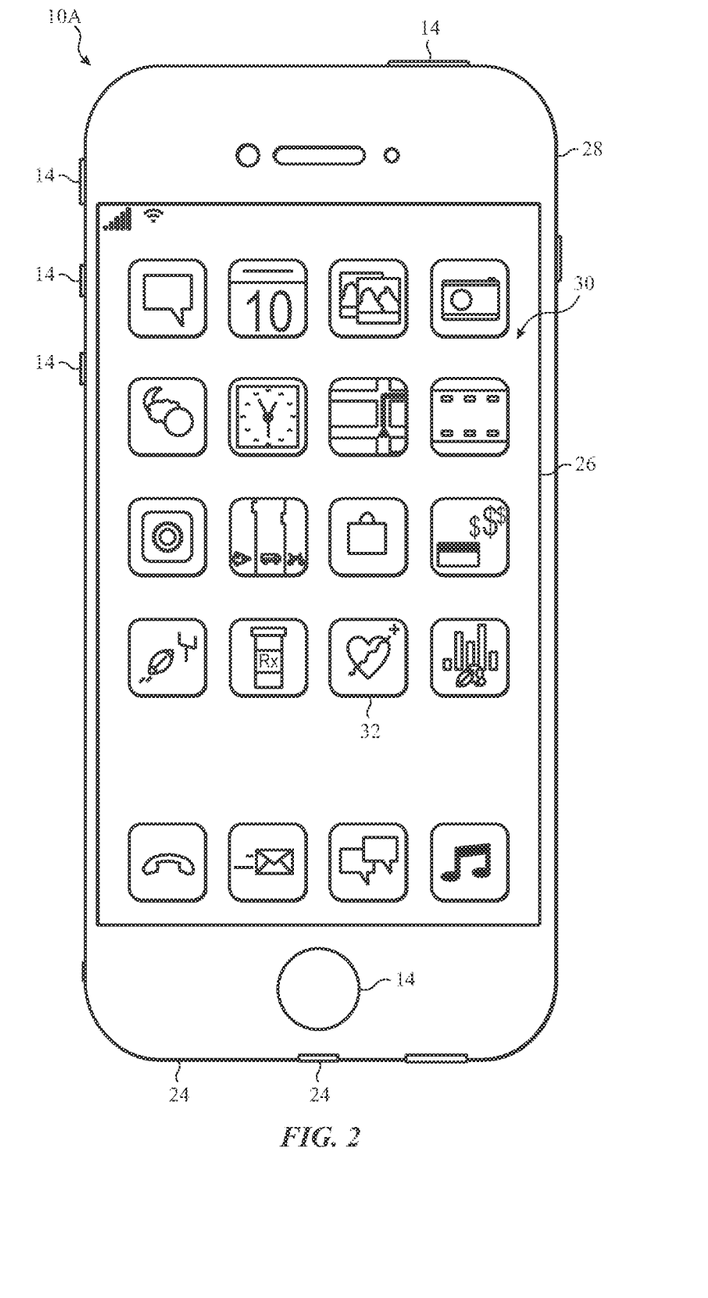
FIG. 2 is an example of the electronic device of FIG. 1, in accordance with an embodiment.

Additionally, as depicted, input structures 14 may open through the enclosure (e.g., housing) 28. As described above, the input structures 14 may enable a user to interact with the handheld device 10A. For example, the input structures 14 may activate or deactivate the handheld device 10A, navigate a user interface to a home screen, navigate a user interface to a user-configurable application screen, activate a voice-recognition feature, provide volume control, and toggle between vibrate and ring modes. Furthermore, as depicted, the I/O ports 24 open through the enclosure 28. In some embodiments, the I/O ports 24 may include, for example, an audio jack to connect to external devices. Additionally, the radio frequency system 12 may also be enclosed within the enclosure 28 and internal to the handheld device 10A.

Figure 3:
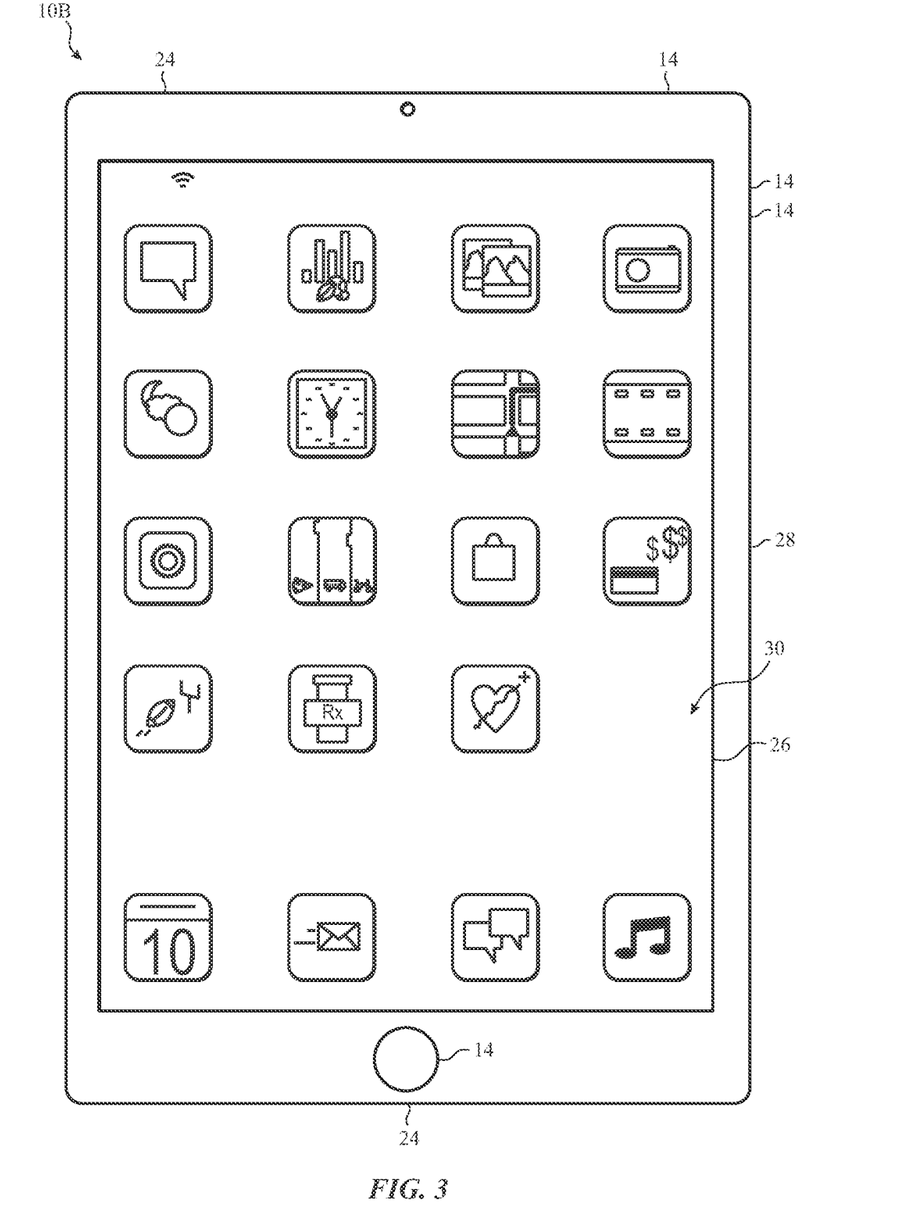
FIG. 3 is an example of the electronic device of FIG. 1, in accordance with an embodiment.
Figure 4:
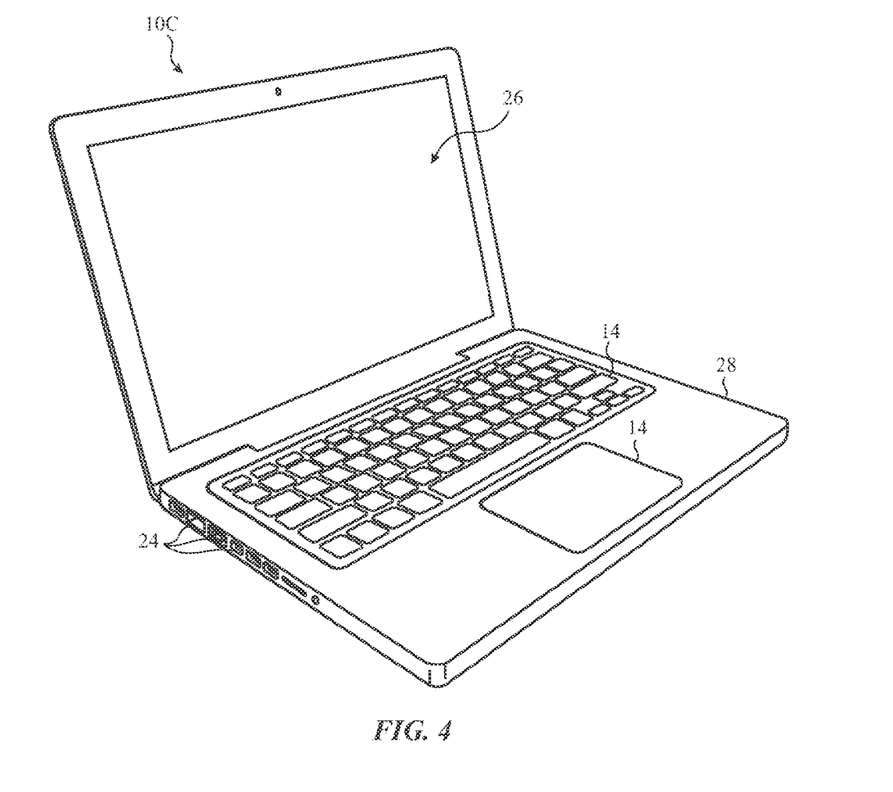
FIG. 4 is an example of the electronic device of FIG. 1, in accordance with an embodiment.

To further illustrate a suitable electronic device 10, a tablet device 10B is described in FIG. 3, such as any iPad® model available from Apple Inc. Additionally, in other embodiments, the electronic device 10 may take the form of a computer 10C as described in FIG. 4, such as any Macbook® or iMac® model available from Apple Inc. As depicted, the tablet device 10B and the computer 10C also include an electronic display 26, input structures 14, I/O ports 24, and an enclosure (e.g., housing) 28. Similar to the handheld device 10A, the radio frequency system 12 may also be enclosed within the enclosure 28 and internal to the tablet device 10B and/or the computer 10C.

As described above, the radio frequency system 12 may facilitate communication with other electronic devices and/ or a network by wirelessly communicating data. To help illustrate, a portion 34 of radio frequency system 12 is described in FIG. 5. As depicted, the portion 34 includes a digital signal generator 36, a transceiver 38, an amplifier component 40, one or more filters 42, an antenna 44, and a controller 46. More specifically, the controller 46 may include one or more processors 48 and memory 50 to facilitate controlling operation of the radio frequency system 12. For example, the controller 46 may instruct the amplifier component 40 and/or the one or more filters 42 to implement determined operational parameters, such as position/aggressiveness of filter rejection or amount of amplification. Accordingly, in some embodiments, the controller processor 48 may be included in the processor 18 and/or separate processing circuitry and the memory 50 may be included in memory 16 and/or a separate tangible non-transitory computer-readable medium. In some embodiments, the controller 46 may be included in the transceiver 38 or separately.

Figure 5:
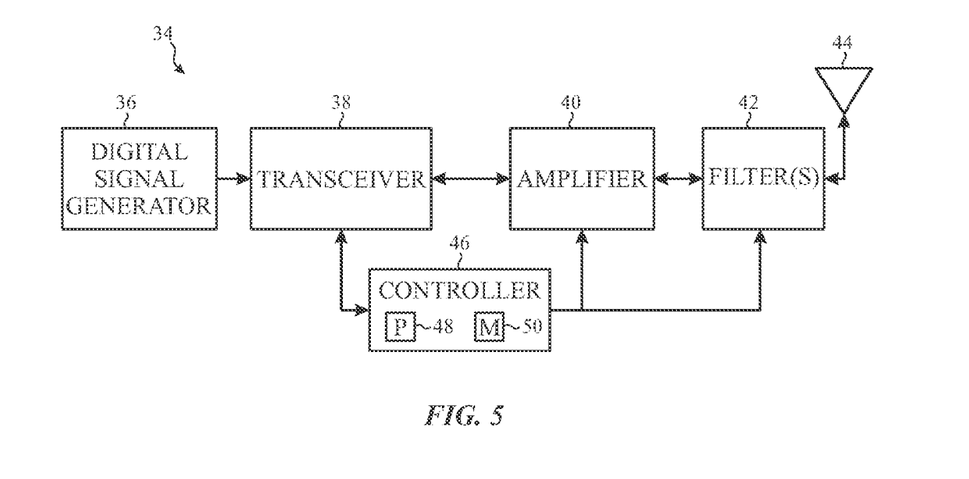
FIG. 5 is block diagram of a portion of the radio frequency system of FIG. 1, in accordance with an embodiment.

Additionally, the digital signal generator 36 may generate a digital representation of data desired to be transmitted from the electronic device 10 by outputting a digital electrical signal. Accordingly, in some embodiments, the digital signal generator 36 may include the processor 18 and/or a separate processing circuitry, such as a baseband processor or a modem in the radio frequency system 12.

The transceiver 38 may then receive the digital electrical signal and generate an analog representation of the data. In some embodiments, the transceiver 38 may generate an analog representation by outputting an envelope voltage to indicate a desired output power of the radio frequency system 12 and an analog electrical signal to indicate phase (e.g., whether high or low) of the digital electrical signal. For example, when the desired output is 16.7 dBm, the transceiver 38 may output an envelope voltage of 1.2 volts. Additionally, when the digital electrical signal is high (e.g., "1"), the transceiver 38 may output an analog electrical signal with a positive voltage and, when the digital electrical signal is low (e.g., "0"), the transceiver 38 may output an analog electrical signal at zero volts.

Since the output power of the analog electrical signal may be small, the amplifier component 40 may receive and amplify the analog electrical signal by outputting an amplified analog electrical signal. More specifically the amplifier component 40 may vary amplitude of the amplified analog electrical signal to enable the output power of the radio frequency system 12 to be adjusted. For example, the amplifier component 40 may adjust amplitude of the amplified analog electrical signal based at least in part on the envelope voltage signal received from the transceiver 38.

As can be appreciated, noise may be introduced by the transceiver 38 and/or the amplifier component 40, such as spurious emissions or out of band emissions. As such, one or more filters 42 may remove introduced noise from the amplified analog electrical signal and output a filtered analog electrical signal. The filtered analog electrical signal may then be wirelessly transmitted to another electronic devices and/or a network via the antenna 44 as modulated radio waves.

In addition to transmitting analog electrical signals, the antenna 44 may receive analog electrical signals from another electronic device and/or a network. For example, the antenna 44 may receive an instruction from a supervisory entity, such as a wireless carrier, instructing the radio frequency system 12 to operate in compliance with a particular specification level. In some embodiments, received analog electrical signals may be received by the antenna 44, filtered by the one or more filter 42, and converted to a digital electrical signal by the transceiver 38. The controller 46 may then determine the instructed specification level based on the digital electrical signal and instruct components in the radio frequency system 12 to adjust operation to be in compliance. For example, the controller 46 may instruct the amplifier component 40 to adjust amplification and the one or more filters 42 to adjust position and/or aggressiveness of filtering, thereby adjusting output power, out of band emissions, and/or spurious emissions transmitted from the radio frequency system 12.

Figure 6:
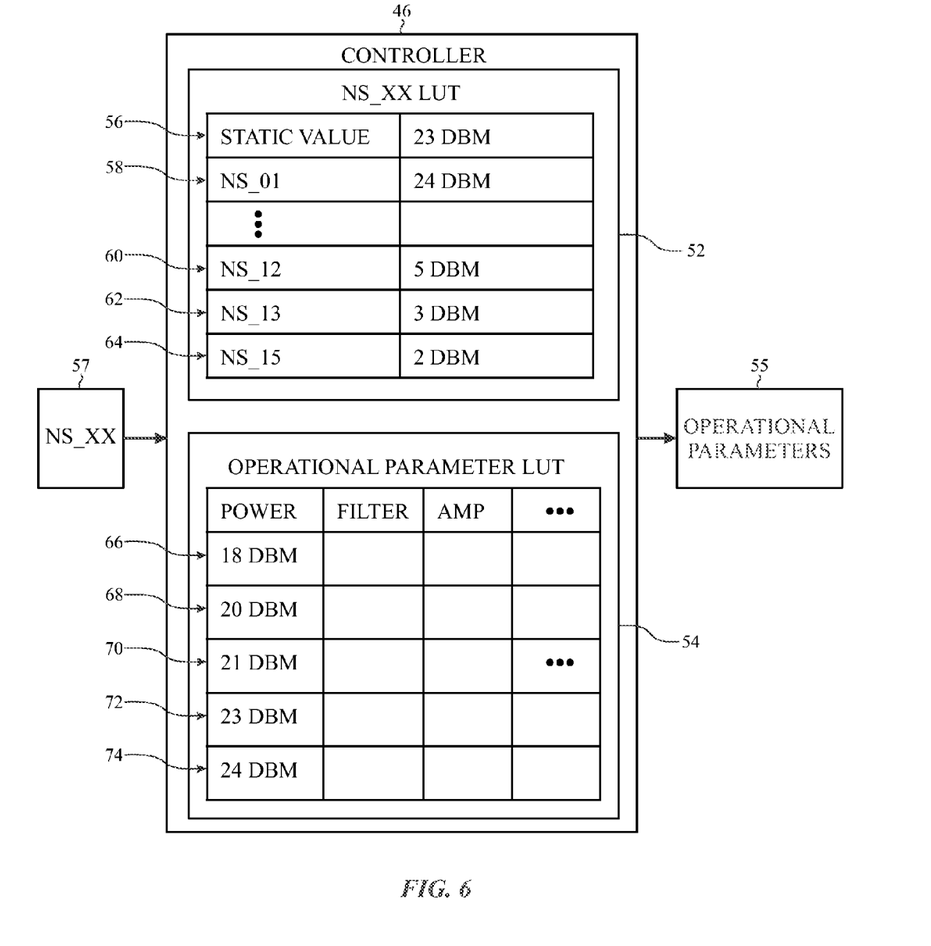
FIG. 6 is a block diagram of a controller in the radio frequency system of FIG. 5, in accordance with an embodiment.

To help illustrate, a block diagram of the controller 46 is described in FIG. 6. As depicted, the controller 46 includes a network signaling value look-up table (NS_XX LUT) 52 and an operational parameter look-up table (LUT) 54. In some embodiments, the network signaling value look-up table 52 and the operational parameter look-up table 54 may be stored in memory 50 and/or another suitable tangible, non-transitory, computer-readable medium. As will be described in more detail below, the controller 46 may utilize the network signaling value look-up table 52 and the operational parameter look-up table to determine operational parameters 55 to implement based at least in part on a network signaling value (NS_XX) 57 received from a supervisory entity. In other embodiments, the controller 46 may perform calculations instead of explicit look-up tables. Additionally, in other embodiments, the network signaling value look-up table 52 and/or the operational parameter look-up table 54 may include multiple look-up tables, for example, divided between pertinent sets of specifications, jurisdiction, frequency bands, and the like.

In the depicted embodiment, the network signaling value look-up table 52 includes a first row 56 that defines a static reference value, which in the depicted embodiment is 23 dBm. Additionally, the network signaling value look-up table 52 includes a second row 58 that defines a maximum output power associated with the network signaling value of NS_01, which in the depicted embodiment is 24 dBm. Thus, in the depicted embodiment, the static reference value is lower than the maximum output power. In other embodiments, the static reference value and the maximum output power may be the same or the static reference value may be higher than the maximum output power.

Additionally, the network signaling value look-up table 52 may include multiple rows that each defines a back off value in relation to the static reference value, which may be used to determine reduced output powers associated with other network signaling values. For example, in the depicted embodiment, the network signaling value look-up table 52 includes a third row 60 that defines a back off value of 5 dBm associated with the network signaling value of NS_12, a fourth row 62 that defines a back off value of 3 dBm associated with the network signaling value of NS_13, and a fifth row 64 that defines a back off value of 2 dBm associated with the network signaling value of NS_15.

Furthermore, the operational parameter look-up table 54 includes rows that define operational parameters associated with various output powers. For example, in the depicted embodiment, the operational parameter look-up table 54 includes a first row 66 that associates operational parameters with an output power of 18 dBm, a second row 68 that associates operational parameters with an output power of 20 dBm, a third row 70 that associates operational parameters with an output power of 21 dBm, a fourth row 72 that associates operational parameters with an output power of 23 dBm, and a fifth row 74 that associates operational parameters with an output power of 24 dBm. In some embodiments, the operational parameters 55 may be implemented to adjust output power, out of band emissions, and/or spurious emissions transmitted from the radio frequency system 12. For example, the operational parameters 55 may include position (e.g., frequency) of filter rejection, aggressiveness of filter rejection, amplification of the amplifier component 40, or any combination thereof.

As such, the radio frequency system 12 may transmit analog electrical signals in compliance with a received network signaling value 57 by implementing determined operational parameters 55. To help illustrate, a process 76 for transmitting analog electrical signals is described in FIG. 7. Generally, the process 76 includes powering on a radio frequency system (process block 78), determining a network signaling value look-up table (process block 80), determining an operational parameters look-up table (process block 82), determining a network signaling value (process block 84), determining a desired output power (process block 86), determining associated operational parameters (process block 88), and wirelessly transmitting analog electrical signals (process block 90). In some embodiments, the process 76 may be implemented using instructions stored in the memory 50 and/or another suitable tangible non-transitory computer-readable medium and executable by the processor 48 and/or another suitable processing circuitry.

Figure 7:
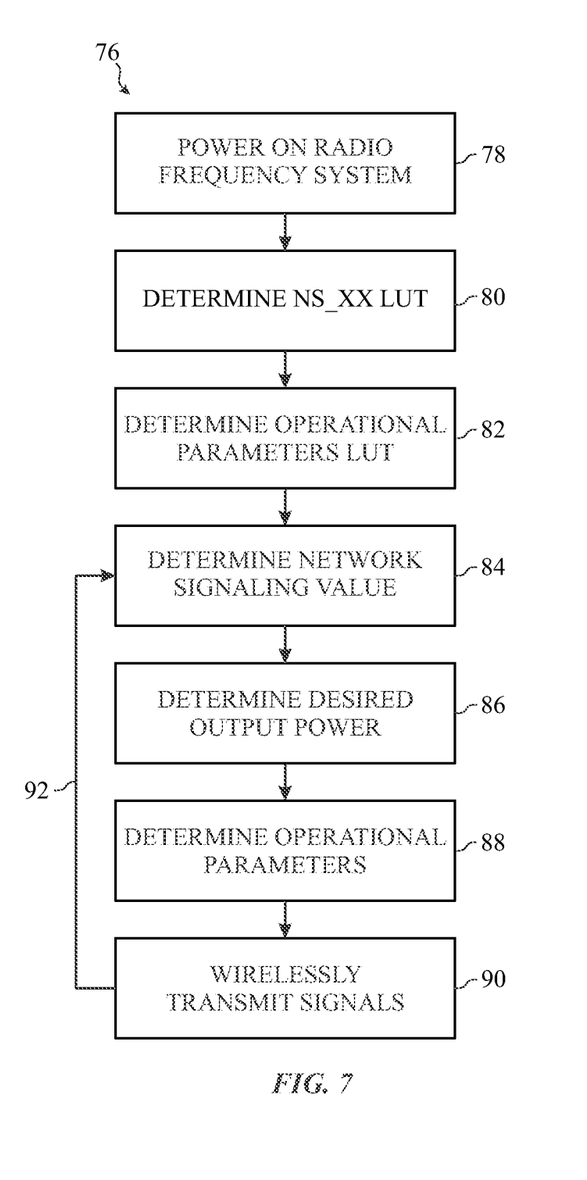
FIG. 7 is a flow diagram describing a process for wirelessly transmitting analog electrical signals using the radio frequency system of FIG. 5, in accordance with an embodiment.

The radio frequency system 12 may be powered on when electrical power is supplied to the radio frequency system 12, for example, from the power source 22 (process block 78). In some embodiments, electrical power may be supplied when the electronic device 10 is powered on. Additionally or alternatively, electrical power may be supplied when the electronic device 10 desires to wirelessly communicate with another electronic device and/or a network.

Upon powering on, the radio frequency system 12 may determine the network signaling value look-up table (NS_XX LUT) 52 (process block 80) and the operational parameters look-up table (LUT) 54 (process block 82). In some embodiments, the network signaling value look-up table 52 and the operational parameters look-up table 54 may be predetermined by a manufacturer and stored in the memory 16, 50, or another tangible, non-transitory, computer-readable medium. As such, the radio frequency system 12 may determine the network signaling value look-up table 52 and the operational parameters look-up table 54 by polling the memory 16 or 20. Additionally, when multiple network signaling value look-up tables 52 and/or operational parameter look-up tables 54 are stored, the radio frequency system 12 may determine the relevant look-up tables based at least in part on pertinent sets of specifications, jurisdiction, frequency band, and the like.

Additionally, once connected to another electronic device and/or a network, the radio frequency system 12 may receive instructions from a supervisory entity to communicate in compliance with a particular specification level (e.g., network signaling value) (process block 84). In some embodiments, the radio frequency system 12 may receive the specification level via the antenna 44 as an analog electrical signal and the transceiver 38 may convert the analog electrical signal into a digital electrical signal.

Based on the instructed specification level, the radio frequency system 12 may determine a desired output power to be in compliance using the network signaling value look-up table 52 (process block 86). As described above, the network signaling value look-up table 52 may describe a static reference value, a maximum output power associated with a first specification level (e.g., NS_01), and one or more back off values in reference to the static reference value associated with one or more other specification levels (e.g., NS_12, NS_13, and NS_15). Thus, using the network signaling value look-up table 52, the radio frequency system 12 may determine that the desired output power is either the maximum output power or a reduced output power determined based on the static reference value and a back off value (e.g., static reference value—back off value).

For example, when a network signaling value of NS_01 is received, the radio frequency system 12 may determine that the desired output power is 24 dBm (e.g., a maximum output power). Additionally, when a network signaling value of NS_12 is received, the radio frequency system 12 may determine that the static reference value is 23 dBm and the back off value is 5 dBm. As such, the radio frequency system 12 may determine that a first reduced output power is 18 dBm (e.g., a first reduced output power). In a similar manner, the radio frequency system 12 may determine that a second reduced output power is 20 dBm (e.g., a second reduced output power) when a network signaling value of NS_13 is received and that a third reduced output power is 21 dB (e.g., a third reduced output power) when a network signaling value of NS_15 is received.

In some instances, the radio frequency system 12 may adjust the maximum output power associated with the network signaling value of NS_01 during operation based on other specifications (e.g., standards or regulations). For example, based on proximity to a user's body, the maximum output power may be reduced to be in compliance with regulations set by the FCC. In other words, in some instances, the maximum output power may end up being less than the static reference value minus a back off value determined from the network signaling value look-up table 52. As such, to facilitate compliance with any such specifications, the radio frequency system 12 may determine that the desired output power is the lesser of the maximum output power and a determined reduced output power (e.g., static reference value minus back off value). For example, continuing with the above example, if the maximum output power is reduced to 14 dBm, the radio frequency system 12 may determine that the desired output power is 14 dBm when a network signaling value of NS_15 is received even though the determined reduced output power is 21 dBm.

Based on the desired output power, the radio frequency system 12 may determine operational parameters to implement using the operational parameters look-up table 54 (process block 88). As described above, the operational parameters look-up table 54 may describe operational parameters associated with multiple output powers. For example, the radio frequency system may identify operational parameters in the first row 66 when the desired output is 18 dBm, the second row 68 when the desired output is 20 dBm, the third row 70 when the desired output is 21 dBm, the fourth row 72 when the desired output is 23 dBm, and the fifth row 74 when the desired output is 24 dBm. In some embodiments, the operational parameters may include position (e.g., frequency) of filter rejection by the one or more filters 42, filtering aggressiveness by the one or more filter 42, amplification by the amplifier component 40, or any combination thereof.

The radio frequency system 12 may then wirelessly transmit analog electrical signals using the identified operational parameters 55 (process block 90) until a different network signaling value is received (arrow 92). As described above, the radio frequency system 12 may operate in compliance with the instructed specification level because the reduced output powers are determined independent from the maximum power output. To help illustrate, in the example described in FIG. 6, when a network signaling value of NS_13 is received, the radio frequency system 12 may determine that the desired output power is 20 dBm by applying the back off value of 3 dBm to the static reference value of 23 dBm. As such, the radio frequency system 12 may implement operational parameters in the second row 68 of the operational parameters look-up table 54.

However, if the reduced output power is determined based on the maximum output power of 24 dBm, the radio frequency system 12 may determine that the reduced output power is 21 dBm when a network signaling value of NS_13 is received and implement operational parameters in the third row 70 of the operation parameters look-up table 54. In fact, since the determined output power is higher, this may result in the radio frequency system 12 not being in compliance with the instructed specification level (e.g., NS_13). To further illustrate, if the reduced output power is determined based on a maximum output power of 22 dBm, the radio frequency system 12 may determine that the reduced output power is 19 dBm when a network signaling value of NS_13 is received and implement associated operational parameters. Since the determined output power is lower, this may result in reduced transmission reliability and additional margin from the specification level (e.g., NS_13).

Thus, by defining the reduced output powers in relation to a static reference value, the radio frequency system may operate in compliance with an instructed specification level and improving transmission reliability with reduced margin between operation (e.g., spurious emissions) and the instructed specification level (e.g., spurious emissions standards). As described above, in addition to improving operational performance, defining the reduced output powers in relation to a static reference value may also improve the design process of the radio frequency system 12.

Figure 8:
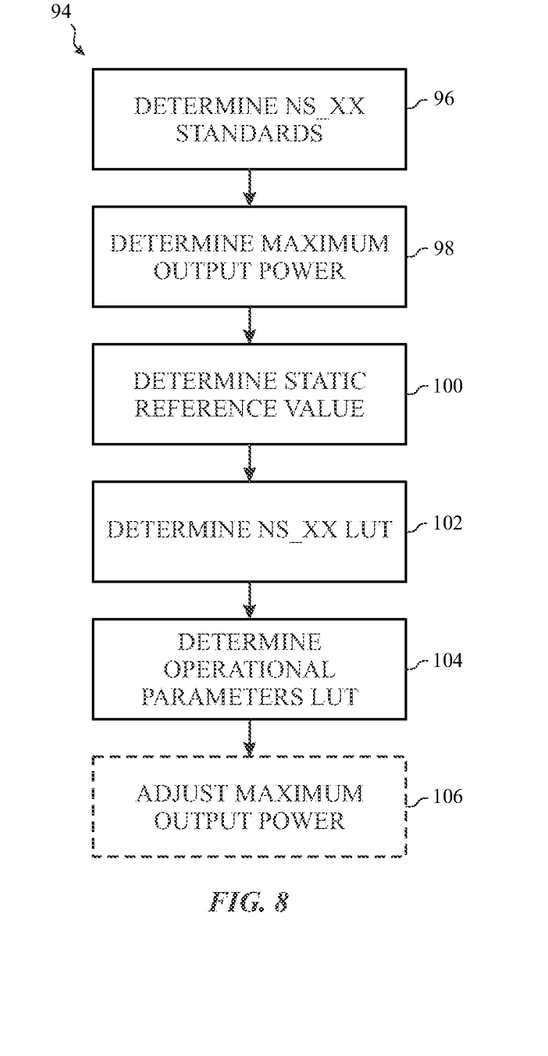
FIG. 8 is a flow diagram describing a process for designing the radio frequency system of FIG. 5, in accordance with an embodiment.

To help illustrate, one embodiment of a process 94 for designing a radio frequency system 12 is described in FIG. 8. Generally, the process 94 includes determining standards associated with network signaling values (process block 96), determining a maximum output power (process block 98), determining a static reference value (process block 100), determining a network signaling value look-up table (process block 102), determining an operational parameters look-up table (process block 104), and optionally adjusting the maximum output power (process block 104). In some embodiments, the process 94 may be implemented by a manufacturer of the radio frequency system 12 using instructions stored in a suitable tangible non-transitory computer-readable medium and executable by a suitable processing circuitry.

Accordingly, the manufacturer may determine the standards associated with various network signaling values (NS_XX) (process block 96). In some embodiments, the network signaling value standards may be received from a standardization body. For example, the manufacturer may receive standards on allowable out of band emissions, allowable spurious emissions, and maximum back off in relation to the maximum output power for multiple network signaling values from the 3rd Generation Partnership Project (3GPP).

The manufacturer may then determine a maximum output power based at least in part on the network signaling value standards (process block 98). Generally, the maximum output power may be determined based on various factors, such as various specification (e.g., standards or regulations), power consumption, efficiency, and/or antenna performance. For example, the 3rd Generation Partnership Project (3GPP) sets a standard that the maximum output power be between 21-25 dBm. Additionally, within the standardized range, the maximum output power may be determined to, for example, meet spurious emissions limits in protected/restricted frequency bands and/or balance power consumption (e.g., battery life) with antenna performance (e.g., transmission reliability).

Additionally, the manufacturer may determine a static reference value (process block 100). As discussed above, the 3rd Generation Partnership Project (3GPP) provides a maximum back off value for each network signaling value in relation to the maximum output power. As such, the manufacturer may define the static reference value close to or the same as the maximum output value to facilitate compliance with the maximum back off standards. For example, in some embodiments, the static reference value may be determined as a common or initial maximum output power, such as 23 dBm.

The manufacturer may then determine the network signaling value look-up table (NS_XX LUT) 52 (process block 100). As described above, the network signaling value look-up table 52 may associate multiple network signaling values with either a maximum output power or a back off value in relation to the static reference value. More specifically, based on the network signaling value standards, the manufacturer may determine desired output powers to be in compliance with an instructed network signaling value. For example, the manufacturer may determine that operating at the maximum output power enables compliance with a first network signaling value (e.g., NS_01) and store the association in the network signaling value look-up table 52. In some embodiments, the manufacturer may in fact determine multiple network signaling value look-up tables 52 based on pertinent sets of specifications, jurisdiction, frequency bands, and the like.

Additionally, the manufacturer may determine that a reduced output power enables compliance with a second network signaling value. More specifically, when the desired output power is a reduced output power, the manufacturer may determine a back off value in relation to the static reference value that results in the reduced output power. For example, when the static reference value is 23 dBm and the desired output power is 20 dBm, the manufacturer may determine that the back off value is 3 dBm even though the maximum output power may be 24 dBm. As such, the manufacturer may determine a back off value used to determine a reduced output power that enables compliance with a second network signaling value and store the associated back off value in the network signaling value look-up table 52. In some embodiments, the manufacturer may in fact determine multiple operational parameter look-up tables 54 based on pertinent sets of specifications, jurisdiction, frequency bands, and the like.

The manufacturer may then determine the operational parameters look-up table (LUT) (process block 104). More specifically, the manufacturer may determine operational parameters of the radio frequency system 12, which when implemented enable the radio frequency system 12 to transmit analog electrical signals at the desired output power and in compliance with the instruct network signaling value. For example, the operational parameters may include position (e.g., frequency) of filter rejection by one or more filters 42, aggressiveness of filter rejection by the one or more filters 42, amplification by the amplifier component 40, or any combination thereof. In some embodiments, the operational parameters may be determined by running the radio frequency system 12 through testing to determine out of band emissions and spurious emissions with various sets of operational parameters. The manufacturer may enter the determined operational parameters in the operational parameters look-up table 54 and store the operational parameters look-up table 54 in memory 50.

As described above, the maximum output power may be determined based on factors such as various specifications (e.g., regulations or standards), power consumption, efficiency, and/or antenna performance. As such, during the design process, the maximum output power may be adjusted (process block 104). However, since the back off values associated with the network signaling values in the network signaling value look up table 52 and the operational parameters associated with the reduced output powers in the operational parameters look-up table 54 are determined relatively independent from the maximum output power, they may remain largely unchanged. In this manner, the redesign associated with adjusting the maximum output power may be reduced, thereby improving the design process.

Accordingly, the technical effects of the present disclosure include improving design and/or operation of a radio frequency system, particularly at reduced output powers. More specifically, the radio frequency system may be designed so that reduced output powers and associated operational parameters are determined relatively independently from a maximum output power. As such, redesign of the radio frequency system when the maximum output power is adjusted may be reduced. Additionally, the operational parameters associated with an instructed specification level may be determined independently from the maximum output power. As such, even at varying maximum output powers, the operational parameters may be implemented such that the radio frequency system operates in compliance with the instructed specification level and with improved transmission reliability (e.g., reduced margin from the instructed specification level).

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

What is claimed is:

1. A radio frequency system configured to wirelessly transmit an analog electrical signal, wherein the radio frequency system comprises:
   a first look-up table configured to describe a static reference value, association between a maximum output power and a first specification level, and association between a first back off value and a second specification level, wherein the first back off value is defined in relation to the static reference value and used to determine a first reduced output power; and
   a second look-up table configured to describe association between the maximum output power and a first set of operational parameters and to describe association between the first reduced output power and a second set of operational parameters;
   wherein the radio frequency system is configured to wirelessly transmit the analog electrical signal in compliance with an instructed specification level instruction from a supervisory entity by:
      determining a desired output power of the analog electrical signal based on the instructed specification level using the first look-up table; and
      implementing operational parameters determined based on the desired output power using the second look-up table.

2. The radio frequency system of claim 1, wherein the first look-up table is a network signaling value look-up table configured to describe association between the maximum output power and a first network signaling value and to describe association between the first back off value and a second network signaling value, wherein the first network signaling value and the second network signaling value comprise different standards regarding allowable spurious emissions transmitted in the analog electrical signal.

3. The radio frequency system of claim 1, wherein the second look-up table is an operational parameters look-up table and the first set of operational parameters and the second set of operational parameters comprise position of filter rejection by a filter, aggressiveness of filter rejection by the filter, amplification by an amplifier component, or any combination thereof.

4. The radio frequency system of claim 1, wherein the first look-up table is configured to describe association between a second back off value and a third specification level, wherein the second back off value is defined in relation to the static reference value and used to determine a second reduced output power and the second look-up table is configured to describe association between the second reduced output power and a third set of operational parameters.

5. The radio frequency system of claim 1, wherein the radio frequency system is configured to determine the desired output power by determining that the desired output power is the maximum output power when the first specification level is received and that the desired output is the first reduced output power when the second specification level is received, wherein the first reduced output power is determined by subtracting the first back off value from the static reference value.

6. The radio frequency system of claim 1, wherein the radio frequency system is configured to determine the desired output power by determining that the desired output power is a lesser of the maximum output power and the first reduced output power when the second specification level is received.

7. The radio frequency system of claim 1, wherein the radio frequency system is configured to implement the operation parameters by instructing a filter and an amplifier component to adjust operation.

8. The radio frequency system of claim 1, wherein the static reference value is different from the maximum output power.

9. The radio frequency system of claim 8, wherein the static reference value is 23 dBm.

10. The radio frequency system of claim 1, the first specification level is a first network signaling value and the second specification level is a second network signaling value.

11. The radio frequency system of claim 1, wherein the first specification level is a network signaling value of NS_01 and the second specification level is a network signaling value of NS_12, NS_13, or NS_15.

12. A tangible, non-transitory, computer-readable medium configured to store instructions executable by a processor of a radio frequency system, wherein the instructions comprise instructions to:
   determine, using the processor, a network signaling value received from a supervisory entity;
   determine, using the processor, a desired output power of the radio frequency system by inputting the network signaling value into a network signaling value look-up table, wherein the network signaling value look-up table associates the network signaling value to a back off value defined in relation to a static reference value different from a maximum output power of the radio frequency system;
   determine, using the processor, a set of operational parameters associated with the desired output power by inputting the desired output power into an operational parameters look-up table, wherein the operational parameters look-up table associates sets of operational parameters with various output powers; and
   instruct, using the processor, the radio frequency system to transmit analog electrical signals at the desired output power and in compliance with the network signaling value by implementing the set of operational parameters.

13. The tangible, non-transitory, computer readable medium of claim 12, wherein the instructions to determine the desired output power comprise instructions to subtract the back off value from the static reference value.

14. The tangible, non-transitory, computer readable medium of claim 12, wherein the instructions to determine the desired output power comprise instructions to determine that the desired output power is a lesser of the maximum output power and the static reference value minus the back off value.

15. The tangible, non-transitory, computer readable medium of claim 12, wherein the operational parameters comprise position of filter rejection by a filter, aggressiveness of filter rejection by the filter, amplification by an amplifier component, or any combination thereof.

16. The tangible, non-transitory, computer readable medium of claim 12, wherein the static reference value is 23 dBm.

17. The tangible, non-transitory, computer readable medium of claim 12, wherein the supervisory entity is a wireless carrier.

18. The tangible, non-transitory, computer readable medium of claim 12, wherein the network signaling value comprises standards on allowable spurious emissions and allowable out of band emissions transmitted in the analog electrical signals.

19. A method for designing a radio frequency system, comprising:
   determining, using a processor, standards associated with a plurality of network signaling values, wherein each of the plurality of network signaling values describes a different standard to meet when wirelessly transmitting analog electrical signals from the radio frequency system;
   determining, using the processor, a maximum output power based at least in part on a first one of the plurality of network signaling values;
   determining, using the processor, a static reference value different from the maximum output power;
   determining, using the processor, a first back off value based at least in part on a second one of the plurality of network signaling values to enable determining a first reduced output power using the first back off value and the static reference value;
   storing, using the processor, a network signaling value look-up table in the radio frequency system such that the network signaling value look-up table associates the maximum output power with the first one of the plurality of network signaling values and associates the first back off value with the second one of the plurality of network signaling values;
   determining, using the processor, a first set of operational parameters that when implemented in the radio frequency system transmits the analog electrical signals at the maximum output power in compliance with the first one of the plurality of network signaling values and a second set of operational parameters that when implemented in the radio frequency system transmits the analog electrical signals at the first reduced output power in compliance with the second one of the plurality of network signaling values; and storing, using the processor, an operational parameters look-up table in the radio frequency system such that the operational parameters look-up table associates the first set of operation parameters with the maximum output power and associates the second set of operational parameters with the first reduced output power.

20. The method of claim 19, comprising:

determining, using the processor, a second back off value based at least in part on a third one of the plurality of network signaling values to enable determining a second reduced output power using the second back off value and the static reference value, wherein the network signaling value look-up table associates the second back off value with the third one of the plurality of network signaling values; and determining, using the processor, a third set of operational parameters that when implemented in the radio frequency system transmits the analog electrical signals at the second reduced output power in compliance with the third one of the plurality of network signaling values, wherein the operational parameters look-up table associates the third set of operational parameters with the second reduced output power.

21. The method of claim 19, wherein the second one of the plurality of network signaling values comprises a maximum back off from the maximum output power to achieve the second one of the plurality of network signaling values, wherein the first back off value is less than or equal to the maximum back off from the maximum output power.

22. The method of claim 19, wherein the first and the second sets of operational parameters comprise a position of filter rejection by a filter, aggressiveness of filter rejection by the filter, amplification by an amplifier component, or any combination thereof.

23. The method of claim 19, wherein the first one of the plurality of network signaling values is NS_01.

24. An electronic device comprising:

an antenna configured to wirelessly transmit data from the electronic device to a network as modulated radio waves and to receive a network signaling value from a supervisory entity of the network;

a transceiver configured to generate an analog representation of the data as an analog electrical signal and to generate a digital representation of the network signaling value;

an amplifier component configured to amplify the analog electrical signal to a desired output power by generating an amplified analog electrical signal;

a filter configured to filter the amplified analog electrical signal to remove noise introduced by the transceiver and the amplifier component by generating a filtered analog electrical signal; and a controller configured to determine the desired output power based on the network signaling value and to instruct the amplifier component and the filter to implement operational parameters associated with the desired output power, wherein determining the desired output power comprises determining a static reference value different from a maximum output power of transmitted analog electrical signals and determining a back off value defined in relation to the static reference value.

25. The electronic device of claim 24, wherein the controller is configured to instruct the amplifier component to adjust amplification of the analog electrical signal and to instruct the filter to adjust position of filter rejection, aggressiveness of the filter rejection, or both applied to the amplified analog electrical signal.

26. The electronic device of claim 24, wherein the antenna is configured to wirelessly transmit the data as modulated radio waves in compliance with the network signaling value.

27. The electronic device of claim 24, wherein the electronic device comprises a portable phone, a media player, a personal data organizer, a handheld game platform, a tablet device, a computer, or any combination thereof.

28. The electronic device of claim 24, wherein the controller is configured to determine the back off value using a network signaling value look-up table that associates the network signaling value with the back off value and to determine the operational parameters using an operational parameters look-up table that associates the desired output power with the operational parameters.

* * * * *